United States Patent [19]

Madau

[11] Patent Number: 5,510,765

[45] Date of Patent: Apr. 23, 1996

[54] MOTOR VEHICLE SECURITY SENSOR SYSTEM

[75] Inventor: Adrian Madau, Wesseling Keldenich, Germany

[73] Assignee: Ford Motor Company, Dearborn, Mich.

[21] Appl. No.: 1,598

[22] Filed: Jan. 7, 1993

[51] Int. Cl.⁶ ................................................. G08B 13/00
[52] U.S. Cl. .................... 340/541; 340/429; 340/522; 340/552; 340/566
[58] Field of Search ................................. 340/565, 566, 340/522, 527, 541, 544, 550, 426, 429, 552–554; 367/93–94, 906; 381/159, 86

[56] References Cited

U.S. PATENT DOCUMENTS

| | | | |
|---|---|---|---|
| 3,801,978 | 4/1974 | Gershberg et al. | 340/516 |
| 4,368,460 | 1/1983 | Clinard et al. | 340/522 |
| 4,401,976 | 8/1983 | Stadelmayr | 340/522 |
| 4,794,368 | 12/1988 | Grossheim et al. | 340/426 |
| 4,833,450 | 5/1989 | Buccola et al. | 340/506 |
| 4,845,464 | 7/1989 | Drori et al. | 340/429 |
| 4,933,664 | 6/1990 | Igawa et al. | 340/425.5 |
| 5,117,220 | 5/1992 | Marino et al. | 340/566 X |

FOREIGN PATENT DOCUMENTS 0233390  8/1987  European Pat. Off. .
61-135845  6/1986  Japan .

OTHER PUBLICATIONS

"Sensitive Vehicle Security System", *Automotive Engineer*, No. 5, Nov. 1991, Bury St. Edmunds, p. 57.

*Primary Examiner*—Thomas Mullen
*Attorney, Agent, or Firm*—Roger May; Mark L. Mollon

[57] ABSTRACT

Sound, vibration and motion are sensed within a motor vehicle to detect glass breakage and unauthorized intrusion into the interior or passenger compartment of the vehicle. Sound and vibration sensing are used to detect glass breakage with motion detection by means of radar or microwaves being utilized for intrusion detection to provide reliable recurring entry detection. The system may be operated to activate the motion sensing only after glass breakage is detected to permit persons and pets to occupy a motor vehicle having a security sensor system which is fully armed. Numerical values are assigned to specific physical sounds and vibrations with the resulting totals being compared to a threshold to determine whether glass breakage has occurred.

15 Claims, 6 Drawing Sheets

MOTOR VEHICLE SECURITY SENSOR SYSTEM

BACKGROUND OF THE INVENTION

The present invention relates in general to security systems for motor vehicles and, more particularly, to security sensor system apparatus and methods of operating that apparatus in a motor vehicle security system wherein the sensor system augments the security system by detecting glass breakage and intrusion into the interior of the motor vehicle without opening a door or other entry point.

A variety of motor vehicle alarm systems are known in the art. The common goal of all these alarm systems is to secure the vehicle from unauthorized intrusions once the vehicle has been closed and locked. Typically, motor vehicle alarm systems secure at least the interior of the vehicle or the passenger compartment by sensing the status of entry points into the passenger compartment. Such alarm systems perform what is referred to as perimeter sensing which is conveniently performed by monitoring door sensors or switches provided, for example, to light up the interior of a vehicle when one or more of its doors are open. Additional sensors may be provided to monitor opening of a hatchback, hood, trunk, sunroof and possibly even a fuel door. When any of the sensors detect opening of the associated entryway into the vehicle, a signal is sent to a centralized alarm control unit.

If the control unit is armed, it generates an alarm signal which in turn activates an alarm. The alarm may be visual for example by flashing the headlights of the vehicle and/or audible for example by activating the horn of the vehicle. In any event, the alarm is activated only for a limited time period prior to being reset. The alarm draws attention to the unauthorized access to the vehicle and is intended to scare off a would-be intruder who has caused the alarm signal to be generated. The alarm signal may also activate a communications system to alert a remote location such as a local police department, the vehicle owner, security personnel or the like of the intrusion.

More sophisticated alarm systems detect intruders who attempt to access or access the interior of a vehicle without opening doors, hatches or the like of the vehicle. Such systems can monitor the breakage of glass within a motor vehicle and generate an alarm signal upon glass breakage detection. Other systems detect such intruders by sensing motion or the presence of intruders within the interior of the motor vehicle. For example, ultrasonic energy systems are used to monitor for motion within the interior of a vehicle and D-field systems are used to monitor for the presence of an intruder. Electric fields generated within a vehicle by D-field systems are disrupted by the presence of an intruder.

Unfortunately, for reliable operation of known ultrasonic and D-field intruder sensors, a motor vehicle including an intruder sensor must be closed. Further, if a person or pet is present in the vehicle, the security system cannot be activated since the motion and/or presence of the person or pet would be sensed and result in a false alarm.

Accordingly, there is a need for an improved motor vehicle security sensor system for monitoring a motor vehicle and reliably detecting intrusions into the interior of the vehicle without opening the doors or other entryways into the vehicle. While the sensor system can stand-alone, preferably it would be used in combination with a perimeter security system to complement the perimeter security system and enhance vehicle security. Preferably, the sensor system would permit security system activation with persons and/or pets present in a vehicle interior for most vehicles, and would operate properly even if the vehicle was not closed but was ventilated by opening the windows by small amounts.

SUMMARY OF THE INVENTION

This need is met by a security sensor system wherein sound, vibration and motion are sensed within a motor vehicle to detect glass breakage and intrusion into the interior of the motor vehicle. Sound and vibration sensing are used to detect glass breakage with motion detection by means of radar or microwaves being utilized for intrusion detection. To permit persons and pets to occupy a motor vehicle having a security sensor system which is fully armed, the system where possible is operated such that the motion sensing radar or microwave unit is activated only after glass breakage has been detected. While such operation is possible in the vast majority of vehicles, it is preferred to enable motion sensing whenever the system is armed in vehicles which can be easily accessed by means other than doors, hatchbacks and broken glass, i.e. convertible vehicles having soft or otherwise removable tops or top portions.

The system is operated by assigning numerical values to specific physical sounds and vibrations. The values are assigned and totaled upon detection of vibrations above a predefined noise level or upon detection of significant sound levels with the resulting total being compared to a threshold to determine whether glass breakage has occurred. Motion within the vehicle generates an alarm typically only after glass breakage has been detected, except for convertibles and other vehicles having easy access via other than conventional entryways or glass covered openings. If a person or pet is within a vehicle, after glass breakage multiple alarms up to the alarm limit of the system will be activated due to the motion of the person or pet. Such multiple alarm activity serves to better protect any person or pet within the vehicle.

In accordance with one aspect of the present invention, a security sensor for a motor vehicle having a body and a closable interior compartment comprises accelerometer means for monitoring vibrations within the body of the vehicle and generating force signals representative of the vibrations. Acoustic monitor means are provided for sensing acoustic energy within the interior of the vehicle and generating acoustic signals representative of the acoustic energy. Microwave motion sensing means provides for detecting motion within the interior of the vehicle and generating motion detection signals representative of sensed motion. Processor means coupled to the accelerometer means, the acoustic monitor means and the microwave sensing means are used to analyze the acoustic signals and the force signals to detect glass breakage within the vehicle and for analyzing the motion detection signals to detect intrusion into the interior of the vehicle. In most vehicles, the processor means further provides for activating the microwave motion sensing means upon the detection of glass breakage within the vehicle.

In accordance with another aspect of the present invention, a method of operating a motor vehicle security system comprises the steps of: generating force signals in response to vibrations within the vehicle; generating low frequency acoustic energy signals in response to low frequency acoustic energy within the vehicle; generating high frequency acoustic energy signals in response to high frequency acoustic energy within the vehicle; sampling the low frequency acoustic energy signals and the high frequency acoustic energy signals in response to force signals exceeding a predetermined noise level to determine a low frequency acoustic energy sample and a high frequency acoustic energy sample; storing a first series of force signals in response to force signals exceeding the predetermined noise level; assigning values to the force signals exceeding a first defined magnitude; assigning values to the low frequency acoustic energy sample; assigning values to the high frequency acoustic energy sample; summing the values of the force signals, the low frequency acoustic energy sample and the high frequency acoustic energy sample to arrive at a sum; and, utilizing the sum of the values to determine whether to activate an alarm signal indicating glass breakage within the vehicle.

This method may also include the step of generating broadband acoustic energy signals with the steps commencing with the step of sampling the low and high frequency acoustic energy signals being alternately or also performed in response to broadband acoustic energy signals exceeding a defined sound level. In most vehicles, the method further comprises the step of activating a microwave sensor to detect motion within the vehicle after detection of glass breakage within the vehicle.

In accordance with yet another aspect of the present invention, a method of sensing intrusion into a motor vehicle comprises the steps of: detecting vibrations within the vehicle; sampling acoustic energy within a first narrow low frequency band within the vehicle if the vibrations exceed a noise level to determine a low frequency band acoustic energy sample; sampling acoustic energy within a second high frequency band within the vehicle if the vibrations exceed the noise level to determine a high frequency band acoustic energy sample; recording vibrations within the vehicle over a first selected time period after detecting vibrations within the vehicle exceeding the noise level; comparing vibrations recorded within the first selected time period to a band defined by a maximum vibration signal level and a minimum vibration signal level; sampling vibrations within the vehicle over a second selected time period if at least one of the vibrations recorded within the first selected time period is above the band or at least one of the vibrations recorded within the first selected time period is below the band; and, evaluating the low and high frequency band acoustic energy samples, the recorded vibrations and the sampled vibrations to determine whether glass has been broken within the vehicle.

This method may also include the step of detecting broadband acoustic energy within the vehicle with the steps commencing with the step of sampling acoustic energy within a first narrow low frequency band being alternately or also performed in response to broadband acoustic energy within the vehicle exceeding a defined sound level. The method preferably further comprises the step of monitoring motion within the vehicle using microwave sensing means.

It is a feature of the present invention that improved methods and apparatus are provided for operating a motor vehicle security sensor system; that improved methods and apparatus are provided for operating a motor vehicle security sensor system by detecting glass breakage by processing force signals representative of vibrations within a vehicle body and sound or acoustic signals representing sounds within the vehicle; that improved methods and apparatus are provided for operating a motor vehicle security sensor system wherein sounds within the vehicle, vibrations within the vehicle body and motion within the vehicle are sensed and used to generate alarm signals; and, that improved methods and apparatus are provided for operating a motor vehicle security sensor system wherein sounds within the vehicle, vibrations within the vehicle body and motion within the vehicle are sensed and used to generate alarm signals with motion sensing only being activated upon determination of glass breakage by means of sensed vibrations and sounds.

Other features and advantages of the invention will be apparent from the following description, the accompanying drawings and the appended claims.

DETAILED DESCRIPTION OF THE INVENTION

Motor vehicle security sensor system apparatus and methods of operating that apparatus will be described in detail with reference to drawing FIGS. 1–4 which form an electrical schematic diagram of an illustrative embodiment of the apparatus. However, a brief overview of the operation of the security sensor system will first be made. While the motor vehicle security sensor system can be used alone to provide a high level of security, it is primarily intended to be used to supplement a perimeter security system which monitors the doors and possibly other entryways into the vehicle such as a hatchback, trunk lid, hood, fuel door and the like.

Accordingly, the motor vehicle security sensor system will be described as supplementing a perimeter security system. The security sensor system offers additional vehicle antitheft protection against intruders who attempt to access the interior of the vehicle without opening any doors or other entryways and discourages vehicle vandalism. Since a large variety of perimeter security systems are available and currently in use in motor vehicles, an exemplary interfacing perimeter system will be described herein only to the extent necessary for an understanding of the invention of the present application.

Whether used alone or as an add-on to a perimeter antitheft system, the motor vehicle security sensor system utilizes three sensing techniques: sound or acoustic energy within the vehicle is sensed; vibration within the body of the vehicle is sensed; and, motion in the interior or within the passenger compartment of the vehicle is monitored using radar or microwaves.

The security sensor system detects vehicle vandalism by sensing a severe impact to the vehicle via a vibration sensor. Thus, with the security sensor system enabled or armed, if a would-be intruder or vandal attacks the vehicle, an alarm is sounded to discourage continued vehicle vandalism. The system generates an alarm signal which in turn activates an alarm either directly or through an associated perimeter alarm system. The security sensor system does not generate an alarm signal under normal socially acceptable and expected impacts such as someone bumping into the vehicle, a person sitting on the vehicle, a ball striking the vehicle, and similar limited severity impacts which would generally not result in vehicle damage.

Impacts to glass of the vehicle may result in glass breakage which is detected by means of combined processing of acoustic energy signals and vibration signals as will be described fully hereinafter. If an intruder breaks vehicle glass, an alarm signal is generated and the radar motion sensor is turned on to detect physical motion inside the vehicle. In this way, if an intruder initially breaks the glass of a vehicle, retreats until the resulting alarm has passed and then returns to enter into the interior of the vehicle through an opening left by broken glass, additional alarms can be sounded reliably in response to motion being sensed within the vehicle.

The radar motion sensor is insensitive to environmental conditions such as heat, sun, wind and the like so that recurring entry detection is improved, for example, over ultrasonic sensors which must be desensitized to a point of being almost useless if glass is broken. The insensitivity to environmental conditions, particularly wind, also permits a vehicle's windows to be slightly opened for ventilation purposes with the system fully armed. The number of alarms sounded is normally limited to prevent overly discharging the vehicle battery and in the belief that if previous alarms have not been effective, additional alarms will not be productive in deterring the intruder.

The radar motion sensor can also be activated momentarily, for example for a 30 second period, immediately after enabling or arming the security sensor system to detect motion in the vehicle at that time. If motion is detected, for example due to a person or pet being within the vehicle, a "double lock function" can be disabled. The double lock function is popular in many vehicle markets, for example in Europe, and prevents the doors from being opened from inside the vehicle if enabled or activated. After an alarm generated due to glass breakage, the security sensor system continues to monitor the vehicle for additional glass breakage, motion, and severe vehicle impacts with new alarms being generated within the alarm definitions of the overall vehicle security system or the security sensor system.

In accordance with this aspect of the present invention, a security system including the security sensor system can be fully armed even if a pet or person remains within the vehicle. If entry into a vehicle is possible other than by doors, hatches or breaking glass, for example through a cloth or removable top or top panel, a sunroof or the like, the motion sensor should be turned on whenever the system is enabled or armed. Accordingly, system arming with pets or people in vehicles such as convertibles is not possible.

As is apparent from the foregoing overview, the security sensor system of the present application is primarily concerned with detecting glass breakage within a vehicle and thereafter, or continuously in the case of some vehicles such as convertibles, monitoring the interior of the vehicle for motion using radar or microwaves. Glass breakage is evidenced by the emission of distinctive sound or acoustic energy and the transmission of intense vibrations within the vehicle body. Accordingly, the security sensor system detects and combines signals representing sound and vibration to reliably detect glass breakage.

Figure 2:
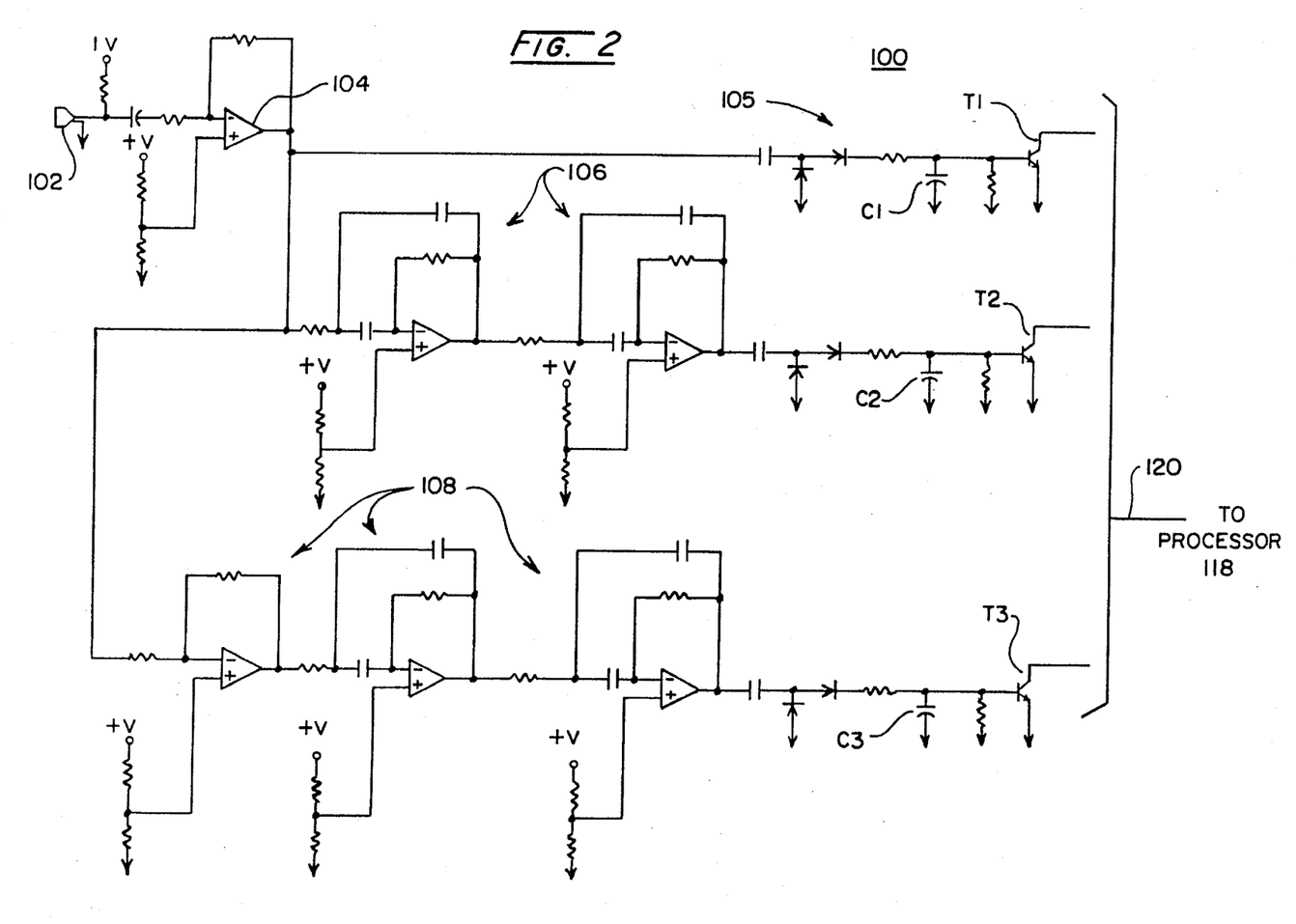

The sound or acoustic energy emitted for glass breakage has been analyzed and found always to contain two frequency bands: the first around 500 hertz and the second around 12 kilohertz. For sound or acoustic energy sensing and analysis, acoustic monitoring means 100 is shown in FIG. 2. The acoustic monitoring means 100 comprises a microphone 102 for picking up acoustic energy from about 15 hertz to about 5 kilohertz within the vehicle.

The microphone 102 generates acoustic output signals which are passed to a buffering amplifier 104. Signals from the amplifier 104 are passed to a broadband acoustic energy channel 105, low frequency filter means and high frequency filter means. The low frequency filter means and high frequency filter means comprise bandpass filter circuits 106 and 108, respectively. The levels of amplification provided by the amplifier 104, the broadband acoustic energy channel 105 and the bandpass filter circuits 106, 108 is empirically determined to be compatible with a given type of vehicle.

The broadband acoustic energy channel 105 generates acoustic energy signals in response to overall acoustic output signals from the microphone 102 while the bandpass filter circuits 106, 108 determine the frequency content of the acoustic output signals in two frequency bands around 500 hertz and 12 kilohertz, respectively. In the illustrated embodiment, the low frequency bandpass filter 106 is a narrow bandwidth filter with a center frequency around 500 hertz and the high frequency bandpass filter 108 is a broad bandwidth filter having a frequency response between approximately 10 kilohertz and 15 kilohertz. Components of the acoustic energy channel 105 are selected such that it generates acoustic energy signals only for significant sound levels within the vehicle.

The acoustic output signals from the amplifier 104 are ac coupled, dc referenced, rectified and used to charge a capacitor C1 to turn on an output transistor T1. The output signals from the bandpass filter circuits 106, 108 are ac coupled, dc referenced, rectified and used to charge capacitors C2, C3 to turn on output transistors T2, T3. The capacitors C1, C2, C3 together with the associated resistors and diodes, thus form pseudo pulse counters for the acoustic monitoring means 100. Output signals from the transistors T1, T2, T3 are passed to a processor 118 shown in FIG. 1 via conductors 120 and processed as will be described to detect glass breakage within a vehicle.

If the output transistor T1 is turned on, then significant broadband acoustic energy, i.e. a high sound level, is present within the vehicle. If the output transistors T2, T3 are turned on, then acoustic energy of the corresponding frequency or frequency band is present within the vehicle and a corresponding flag is set and held for approximately 2 seconds. Each millisecond, the processor 118 checks the output transistor T1, T2 and T3 to determine whether high sound levels are being detected, which may trigger further analysis as will be described, and whether acoustic energy around the two frequencies of interest is present.

Acoustic energy around the two frequencies of interest, 500 hertz and 12 kilohertz, may be present in events other than glass breakage such as for example when keys are rattled across the vehicle glass or the glass is hit with objects which do not break it. To reduce the possibility of false glass breakage alarms, an impact or vibration detector circuit is used to sense vibrations, which are typically less than 400 hertz, that occur within the vehicle body. By monitoring and processing signals representing both the acoustic energy within a vehicle and the vibrations within the vehicle body, the processor 118 is able to determine reliably whether or not glass breakage has occurred.

Figure 3:
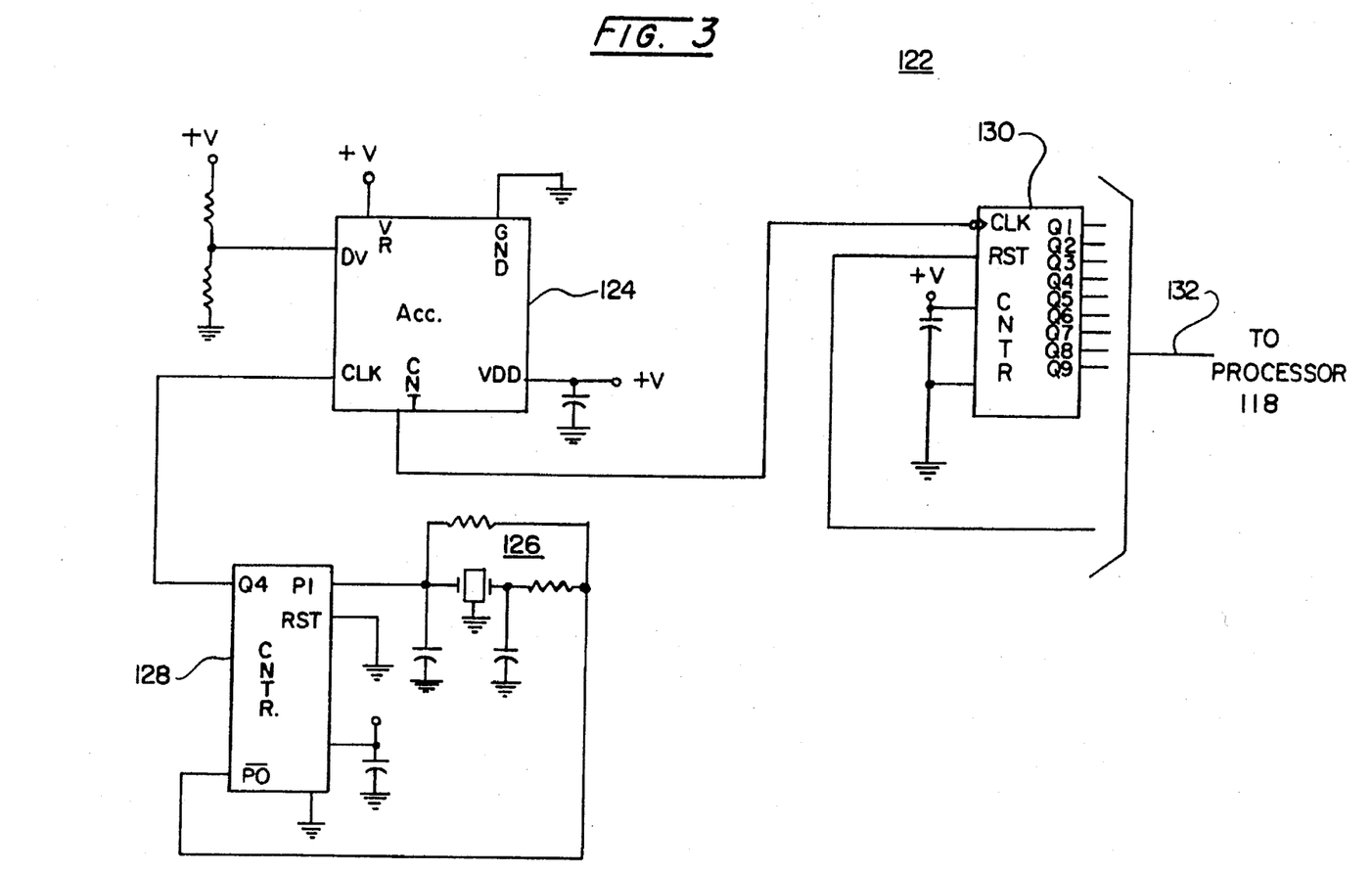

A vibration detector circuit 122, shown in FIG. 3, performs vibration sensing for the security sensor system of the present application. The vibration detector circuit 122 measures vibrations transmitted through the vehicle body due for example to impacts to the vehicle. In addition, it has been determined that forces released when glass shatters or breaks sends intense vibrations into the vehicle body. These vibrations, which are the result of glass breaking as opposed to the impact which causes the glass to break, are measured by the vibration detector circuit 122.

At the heart of the vibration detector circuit 122 is accelerometer means which comprises an electronic accelerometer 124 for monitoring vibrations within the vehicle body and generating force signals representative of the vibrations. In a working embodiment, the accelerometer 124 comprises a Model 1000L accelerometer commercially available from Silicon Designs, Inc. which outputs a series of pulses whose frequency is directly proportional to the G forces at the location of the accelerometer 124.

A 4 megahertz output signal from a resonator circuit 126 is coupled to a 4060 counter circuit 128 to generate a 250 kilohertz clock signal for the accelerometer 124. The pulse output signal from the accelerometer 124 is coupled to a 4040 counter circuit 130 which counts and totals the output pulses from the accelerometer 124 for one millisecond intervals. Each millisecond, the processor 118 also reads the count that appears on the Q1 through Q9 outputs of the counter circuit 130 and processes the resulting count data as will be described to determine, among other things, whether a glass break event is in progress. The processor 118 then resets the counter circuit 130 for counting during the next millisecond interval. The count data from the counter circuit 130 and a reset signal from the processor 118 are carried on conductors 132.

Figure 4:
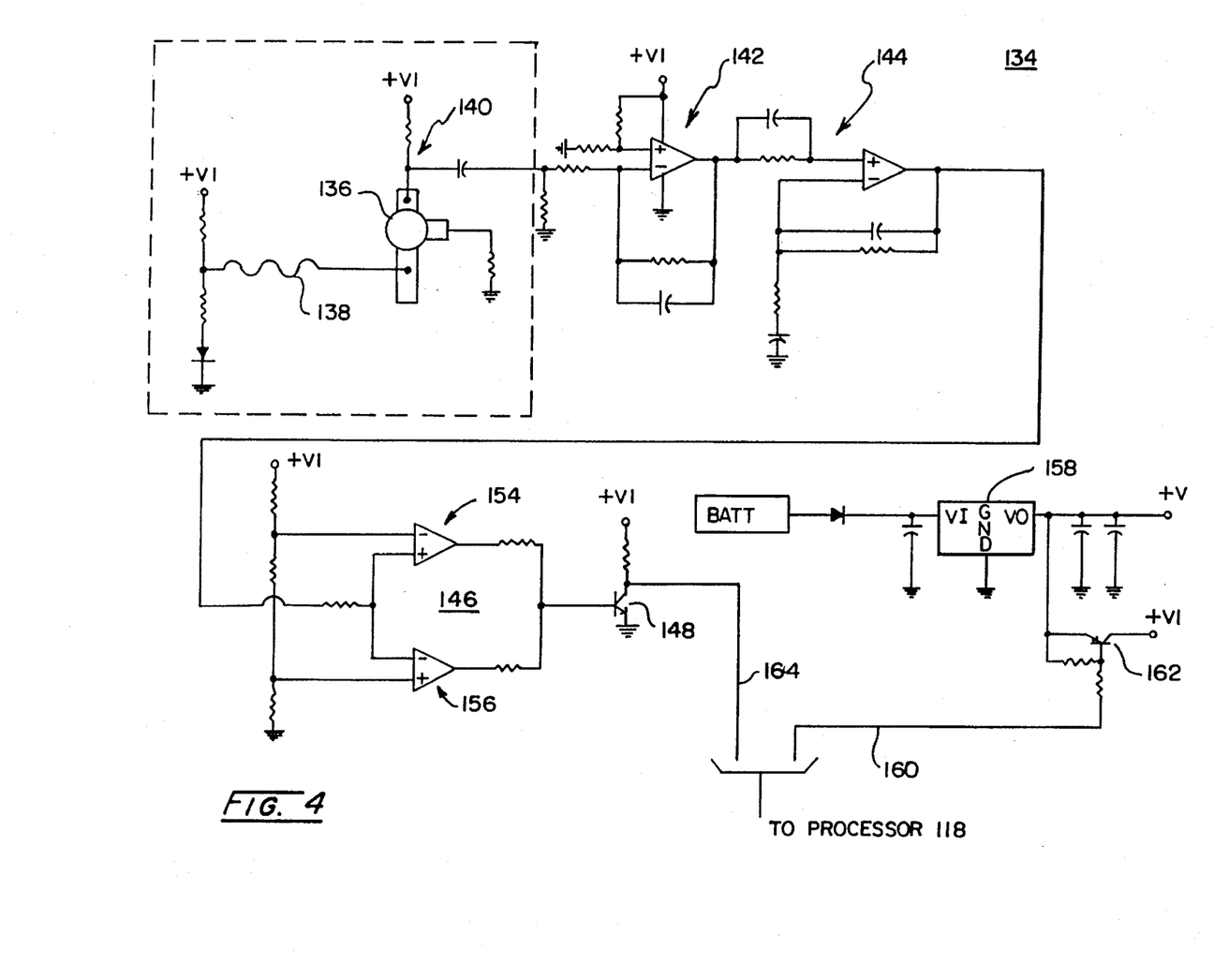

A motion detector circuit 134, shown in FIG. 4, performs motion sensing within the interior of a vehicle for the security sensor system of the present application. The motion sensing is performed by monitoring disturbances to a radar or microwave signal generated by a high frequency transistor 136. Microwave signals at a frequency of approximately 2.45 gigahertz are produced in an inductor/antenna 138. The microwave signals are transmitted within the interior of a vehicle and reflections of the signals influence the form of the signals on the inductor/antenna 138 and hence within the transistor 136 and particularly at its output 140, see FIGS. 6–9.

The signals on the output 140 from the high frequency transistor 136 are ac coupled into two lowpass filters 142, 144, both of which are centered at about 10 kilohertz. The resulting analog output signal from the lowpass filters 142, 144 is coupled to a voltage level detector 146 which turns on an output transistor 148 if the analog signal exceeds a maximum level 150 or falls below a minimum level 152. The voltage level detector 146 comprises a pair of comparator circuits 154, 156 which are referenced to the maximum and minimum levels 150, 152, respectively.

Figure 6:
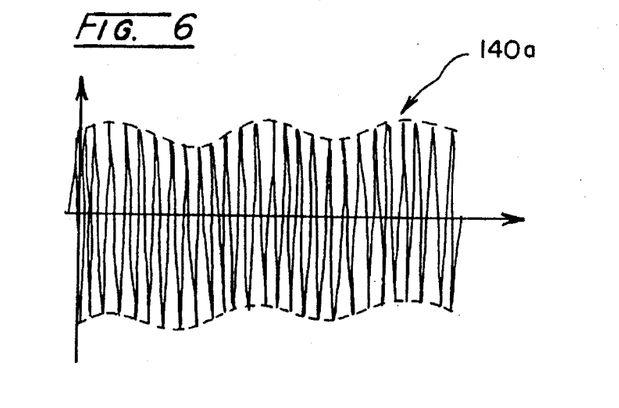
FIGS. 6–9 are graphs of signals within a motion sensing circuit of the security sensor system apparatus of FIG. 1.
Figure 7:
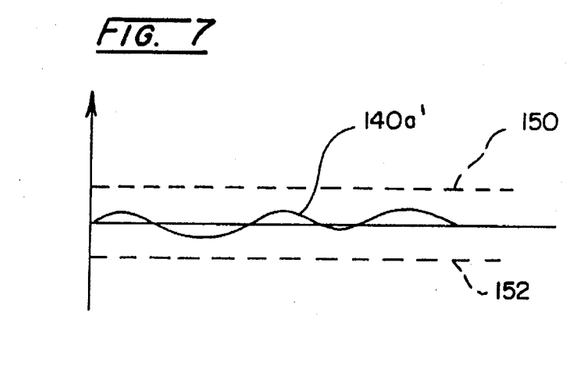
Figure 8:
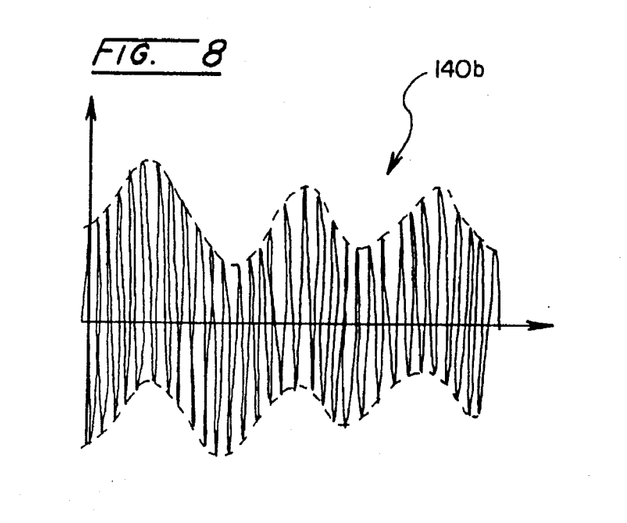
Figure 9:
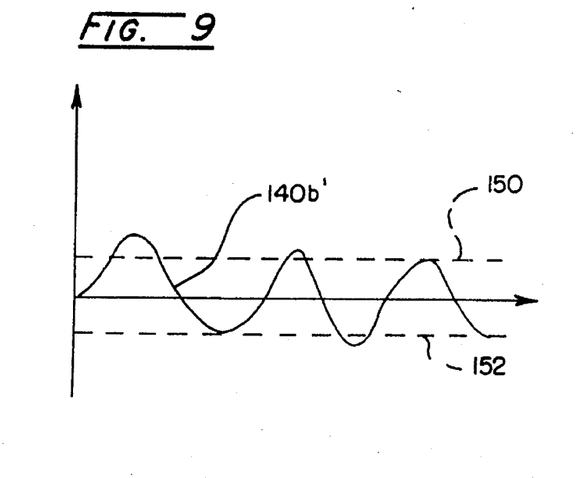

The signals 140a, 140b on the output 140 for no motion within the interior of a vehicle and for motion within the vehicle are shown in FIGS. 6 and 8, respectively. It can be seen that the stable, no motion signal 140a has a low level of ripple in its magnitude resulting in an envelope varying at about 10 kilohertz. After passage through the low pass filters 142, 144, the resulting signal 140a' is shown in FIG. 7 to be well within a band with limits defined by the maximum and minimum levels 150, 152.

On the other hand, the motion signal 140b has a substantially higher level of ripple in its magnitude resulting in an expanded envelope but still varying at about 10 kilohertz. The motion signal 140b shown in FIG. 8 is for limited motion within the vehicle such that after passage through the low pass filters 142, 144 the resulting signal 140b' has peaks and valleys which extend beyond the band defined by the maximum and minimum levels 150, 152. For large amounts of motion within the vehicle, the transistor 148 is maintained in an on condition for extended periods of time.

Power for operation of the security sensor system apparatus is generated, for example, by a voltage regulator circuit 158 which converts and regulates battery voltage to a voltage level +V required for the circuitry of the system. The processor 118 controls whether the motion detector circuit 134 is operating or not by means of a control signal transmitted over a conductor 160 which controls a transistor 162 providing power +V1 to the circuit 134. The transistor 148 is connected to the processor 118 via a conductor 164.

Having described the apparatus of the security sensor system with reference to drawing FIGS. 1–9, operation of that apparatus in accordance with the present invention will now be described.

Figure 5:
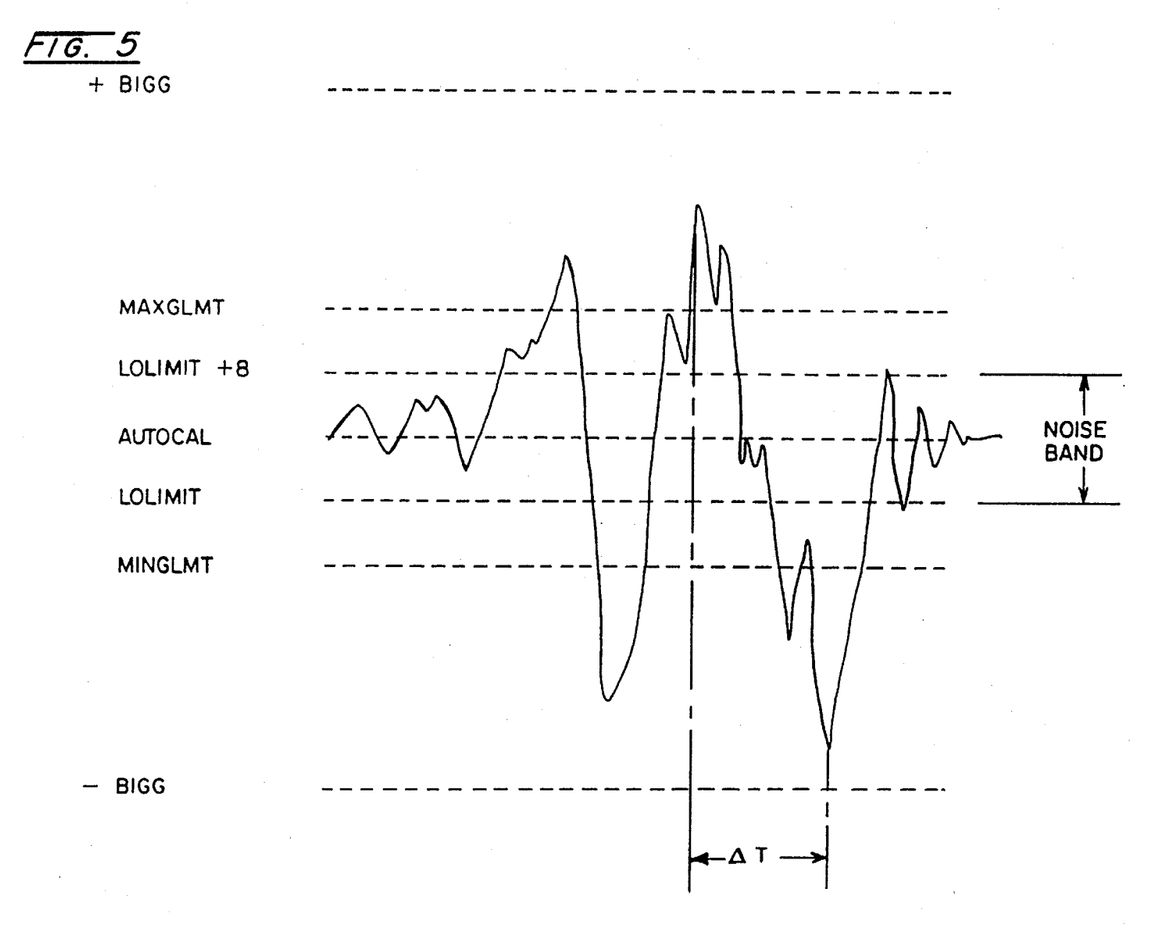
FIG. 5 is a graphical representation of vibrations produced within the body of a motor vehicle due to breaking glass of the vehicle.

Upon initialization of the security sensor system, the processor 118 reads and sums 128 data counts from the counter circuit 130 (128 milliseconds) and divides the resulting sum by 128 to arrive at an autocalibration count AUTOCAL for the accelerometer 124, see FIG. 5 for a graphic representation of this portion of the operation. This autocalibration count AUTOCAL minus 4 counts is stored as LOLIMIT and the autocalibration count AUTOCAL plus 4 counts is stored as LOLIMIT+8. The counts LOLIMIT and LOLIMIT+ 8 define noise levels which trigger further analysis by the processor 118 when exceeded by data counts from the counter circuit 130 and hence by forces exerted on the accelerometer 124. Further analysis by the processor 118 can alternately or also be triggered by the sensing of significant or high sound levels within the vehicle from the acoustic energy channel 105 of the acoustic monitoring means 100.

After autocalibration, the processor 118 reads the acoustic energy channel 105 and the accelerometer data counts from the counter circuit 130 every millisecond as previously described and goes to sleep between reads. If a data count is lower than the LOLIMIT data count or higher than the LOLIMIT+8 data count indicating that a disturbance is being detected by the accelerometer 124, and/or a high sound level is detected, the next 32 data counts read are stored and compared to determine whether forces exceeding a maximum G force MAXGLMT or falling below a minimum G force MINGLMT are present during the 32 millisecond period of time represented by the 32 data counts.

If none of the 32 data counts exceed MAXGLMT or fall below MINGLMT, the processor 118 clears the stored data counts and the FLOFLG and FHIFLG flags and goes back to sleep until the next data count read since such data counts must be present for glass breakage. If one or more of the first 32 data counts exceeds MAXGLMT or falls below MINGLMT, the processor 118 continues storing data counts until 140 data counts are stored. These 140 data counts are used by the processor to determine if a glass break event has occurred.

After the 140 data counts are stored, an additional 512 data counts are read by the processor 118; however, each data count is evaluated immediately and then discarded. While the 512 data counts are not stored in the processor 118, two totals and two magnitude comparisons resulting from evaluation of the 512 data counts are stored in the processor 118.

The first total, the number of times that the 512 data counts exceed a first defined G force, called the extra trigger is stored as XLO. The second total, the number of times that the 512 data counts exceed a second defined G force greater than the first defined G force, called the extra-extra trigger is stored as XXLO. These evaluations are all made relative to the autocalibration count determined as described above.

After the 512 data counts have been processed, flags representative of the outputs of the bandpass filters 106, 108 are read. A low frequency present register or flag FLOFLG will be set if the low frequency output was asserted by the transistor T2 within the last two seconds; and, a high frequency present register or flag FHIFLG will be set if the high frequency output was asserted by the transistor T3 within the last two seconds. The accumulated data is then analyzed to determine whether a glass break event has occurred or not. It is noted that at any time a data count exceeds a very large G value ±BIGG, typically 7 G's, an alarm signal is generated and processing is aborted.

Figure 1:
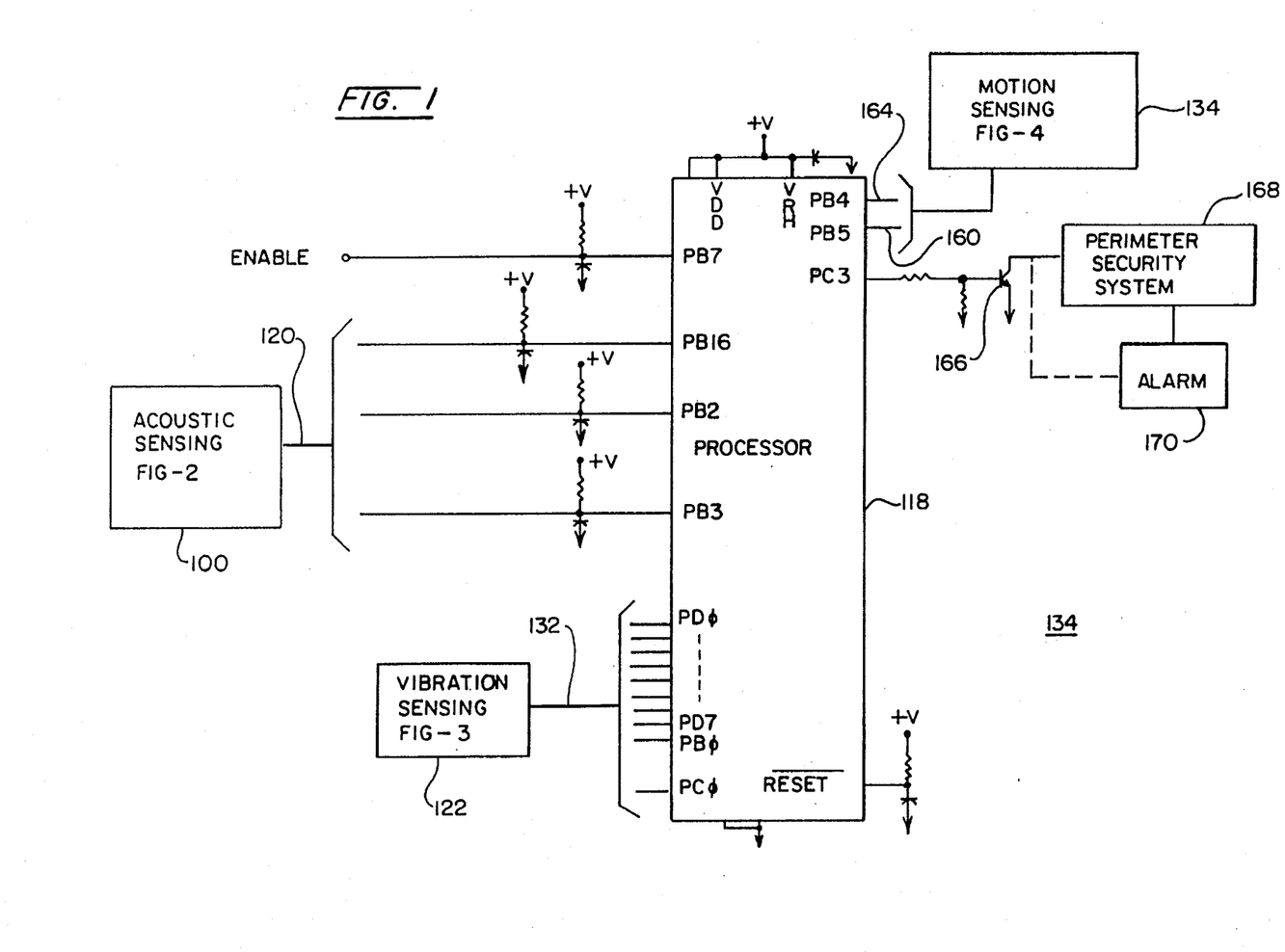
FIGS. 1–4 together form a schematic diagram of motor vehicle security sensor system apparatus.

The analysis of the accumulated data is performed by assigning preset analysis values to the data/flags set, summing the total preset analysis values for each potential glass break event and comparing the total to a threshold. If the total of the preset analysis values exceeds the threshold then a glass break is indicated. A glass break alarm signal as well as other alarm signals, such as alarm signals for motion within the vehicle, is generated as shown in FIG. 1 by the processor 118 turning on a transistor 166. The transistor 166 is shown as being connected to a perimeter security system 168 which responds to the alarm signal by activating an alarm 170 such as for example the vehicle horn and/or lights. Of course, the security sensor system can also be connected directly to the alarm 170 as indicated by the dotted line connection.

The following values can be assigned to the accumulated data and flags set in response to the initial 140 data counts which are stored and the 512 additional data counts which are read, evaluated as described and then discarded. A one (1) is assigned if one or more of the first 140 data counts exceeds MAXGLMT. A one (1) is assigned if one or more of the first 140 data counts falls below MINGLMT. The maximum data count and the minimum data count within the first 140 data counts and the time Δt between the maximum and minimum data counts are determined. If Δt is less than a first predetermined time period Δt1, a one (1) is assigned and if Δt is less than a second predetermined time period Δt2 which is less than the first predetermined time period Δt1, a one (1) is assigned. If XLO exceeds a predetermined limit of a first defined magnitude, a one (1) is assigned. If XXLO exceeds a predetermined limit of a second defined magnitude greater than the first defined magnitude, a one (1) is assigned. If the FHIFLG is set, a four (4) is assigned. If the FLOFLG is set, a four (4) is assigned.

The assigned values are summed and compared to the threshold value, eleven (11) for the above noted values, which must be attained for a valid glass break event to have occurred. If that is the case, a glass break alarm signal is generated by the processor 118 as described above. The specific values assigned to the accumulated data and flag sets as well as the threshold to which the total sum of the assigned values are compared depends to some extent on the vehicle on which the security sensing system is installed. These determinations may also be influenced by the location of the sensors within a vehicle. Currently, the sensors are concealed in two configurations: the accelerometer 124 and motion detector circuit 134 under the rear seat of the vehicle and the microphone 102 in the headliner of the vehicle; and, the microphone 102 and accelerometer 124 under the rear package tray and the motion detector circuit 134 under the rear seat. Of course, other configurations may be preferred for given vehicles.

One example of processor parameters for a 1992 Lincoln Continental vehicle which have been empirically determined for the above flag values and threshold (11) are as follows: MAXGLMT=AUTOCAL+7; MINGLMT=AUTOCAL−6; Δt1=18 msec; Δt2=8 msec; XLO LIMIT=AUTOCAL±4; XXLO LIMIT=AUTOCAL+9 and AUTOCAL−8.

When the motion detector circuit 134 is activated, either at the time the security sensor system is enabled or upon the detection of a glass break event, the processor 118 senses an initial pulse from the circuit 134. The initial pulse is generated by power-up. The processor 118 generates a motion alarm if one of two conditions are sensed during a preset time period. First, the processor 118 totals the amount of time the output of the transistor 148 remains low during the preset time period and generates an alarm signal if a predetermined time is exceeded. Second, if a predetermined number of pulses occur within the preset time period, an alarm signal is generated.

As will be apparent to those skilled in the art, other alarm conditions can be sensed using the motor vehicle security sensor system of the present application. For example, tow-away of a vehicle can be sensed by monitoring the output from the vibration detector circuit 122. As the vehicle is tilted to be towed away, the frequency of the output signal from the accelerometer 124 changes. Using the disclosed accelerometer 124, tilts of approximately 30° can be sensed. Smaller tilt angles can be sensed if a more sensitive accelerometer is used.

Having thus described the methods and apparatus of the present invention in detail and by reference to preferred embodiments thereof, it will be apparent that modifications and variations are possible without departing from the scope of the invention defined in the appended claims.

What is claimed is:

1. A security sensor for a motor vehicle comprising:

accelerometer means for monitoring vibrations within said vehicle and for generating force signals in response to said vibrations;

microphone means for monitoring acoustic energy within an interior passenger compartment of said vehicle and generating acoustic signals representative of said acoustic energy;

first acoustic circuit means coupled to said microphone means for sensing acoustic signals representative of acoustic energy within a first narrow low frequency band and generating low frequency acoustic energy present signals in response thereto;

second acoustic circuit means coupled to said microphone means for sensing acoustic signals representative of acoustic energy within a second high frequency band and generating high frequency acoustic energy present signals in response thereto; and processor means coupled to said accelerometer means, said microphone means, said first acoustic circuit means and said second acoustic circuit means for receiving and processing said force signals, said acoustic signals, said low frequency acoustic energy present signals and said high frequency acoustic energy present signals to detect glass breakage within said vehicle and generate an alarm signal in response to detected glass breakage, said low frequency acoustic energy present signals and said high frequency acoustic energy present signals being sampled in response to force signals exceeding a defined noise level or acoustic signals exceeding a defined sound level.

2. A security sensor for a motor vehicle as claimed in claim 1 further comprising microwave sensing means for detecting motion within said vehicle, said processor means being coupled to said microwave sensing means for generating an alarm signal in response to sensed motion within said vehicle.

3. A motor vehicle security sensor as claimed in claim 2 wherein said first acoustic circuit means comprises a narrow bandpass filter having a center frequency of approximately 500 hertz and said second acoustic circuit means comprises a broad bandpass filter passing frequencies between approximately 10 kilohertz and 15 kilohertz.

4. A method of operating a motor vehicle security system comprising the steps of:

(a) generating force signals in response to vibrations within said vehicle;

(b) generating low frequency acoustic energy signals in response to low frequency acoustic energy within said vehicle;

(c) generating high frequency acoustic energy signals in response to high frequency acoustic energy within said vehicle;

(d) sampling said low frequency acoustic energy signals and said high frequency acoustic energy signals in response to one of said force signals exceeding a predetermined noise level to determine a low frequency acoustic energy sample and a high frequency acoustic energy sample;

(e) assigning preset analysis values to said force signals;

(f) assigning preset analysis values to said low frequency acoustic energy sample;

(g) assigning preset analysis values to said high frequency acoustic energy sample;

(h) summing said preset analysis values assigned to said force signals, to said low frequency acoustic energy sample and to said high frequency acoustic energy sample to arrive at a sum; and (i) utilizing the sum of said preset analysis values to determine whether to activate an alarm signal indicating glass breakage within said vehicle.

5. A method of operating a motor vehicle security system as claimed in claim 4 further comprising the step of generating broadband acoustic energy signals in response to acoustic energy within said vehicle and wherein said steps (d) through (i) are also performed in response to one of said broadband acoustic energy signals exceeding a defined sound level.

6. A method of operating a motor vehicle security system as claimed in claim 5 further comprising the steps of:

activating a microwave sensor to detect motion within said vehicle after detection of glass breakage within said vehicle; and generating additional alarm activating signals in response to said microwave sensor detecting motion within said vehicle after glass breakage within said vehicle.

7. A method of operating a motor vehicle security system as claimed in claim 6 further comprising the step of storing a first series of said force signals in response to one of said force signals exceeding said predetermined noise level and wherein the step of (e) assigning preset analysis values to said force signals comprises the steps of:

assigning a preset analysis value to a force signal of said first series of said force signals which exceeds a maximum force signal level; and assigning a preset analysis value to a force signal of said first series of said force signals which falls below a minimum force signal level.

8. A method of operating a motor vehicle security system as claimed in claim 7 further comprising the steps of:

determining the time between the occurrence of a force signal of said first series of force signals exceeding said maximum force signal level and the occurrence of a force signal of said first series of force signals falling below said minimum force signal level;

comparing said time to a first time period;

assigning a first preset analysis value to said time if said time is less than said first time period; and adding the first preset analysis value of said time to the preset analysis values of said force signals, said low frequency acoustic energy sample and said high frequency acoustic energy sample to arrive at a sum.

9. A method of operating a motor vehicle security system as claimed in claim 8 further comprising the steps of:

comparing said time to a second time period which is less than said first time period;

assigning a second preset analysis value to said time if said time is less than said second time period; and adding the second preset analysis value of said time to the first preset analysis value of said time, and the preset analysis values of said force signals, said low frequency acoustic energy sample and said high frequency acoustic energy sample to arrive at a sum.

10. A method of operating a motor vehicle security system as claimed in claim 9 further comprising the steps of:

storing a second series of said force signals substantially immediately following said first series of said force signals;

processing said second series of said force signals in response to one of said force signals exceeding said noise level;

determining whether first defined number of force signals of said second series of said force signals exceeds a second defined magnitude;

assigning a first preset analysis value to said second series of said force signals if said first defined number of force signals of said second series of said force signals exceeds said second defined magnitude; and adding the first preset analysis value assigned to said second series of said force signals to the first and second preset analysis values of said time and the preset analysis values of said first series of said force signals, said low frequency acoustic energy sample and said high frequency acoustic energy sample to arrive at a sum.

11. A method of operating a motor vehicle security system as claimed in claim 10 further comprising the steps of:

determining whether a second defined number of force signals of said second series of said force signals exceeds a third defined magnitude greater than said second defined magnitude;

assigning a second preset analysis value to said second series of said force signals if said second defined number of force signals of said second series of said force signals exceeds said third defined magnitude; and adding the second preset analysis value assigned to said second series of said force signals to the first preset analysis value assigned to said second series of said force signals, the first and second present analysis values of said time and the preset analysis values of said force signals, said low frequency acoustic energy sample and said high frequency acoustic energy sample to arrive at a sum.

12. A method of sensing intrusion into a motor vehicle comprising the steps of:

(a) detecting vibrations within said vehicle;

(b) sampling acoustic energy within a first narrow low frequency band within said vehicle if detected vibrations exceed a noise level to determine a low frequency band acoustic energy sample;

(c) sampling acoustic energy within a second high frequency band within said vehicle if detecting vibrations exceed said noise level to determine a high frequency band acoustic energy sample;

(d) recording detected vibrations within said vehicle over a first selected time period after detecting vibrations within said vehicle exceeding said noise level;

(e) comparing vibrations recorded within said first selected time period to a band defined by a maximum vibration signal level and a minimum vibration signal level;

(f) sampling vibrations within said vehicle over a second selected time period if at least one of said vibrations recorded within said first selected time period is above said band or at least one of said vibrations recorded within said first selected time period is below said band; and (g) evaluating said low and high frequency band acoustic energy samples, said recorded vibrations and said sampled vibrations to determine whether glass has been broken within said vehicle.

13. A method of sensing intrusion into a motor vehicle as claimed in claim 12 further comprising the step of monitoring motion within said vehicle using microwave sensing means.

14. A method of sensing intrusion into a motor vehicle as claimed in claim 13 wherein said step of monitoring motion within said vehicle is performed only after glass breakage within said vehicle has been determined.

15. A method of operating a motor vehicle security system as claimed in claim 14 further comprising the step of detecting broadband acoustic energy within said vehicle and wherein said steps (b) through (g) are also performed in response to broadband acoustic energy exceeding a defined sound level.

* * * * *